(12) United States Patent
Viot et al.

(10) Patent No.: US 7,716,478 B2
(45) Date of Patent: May 11, 2010

(54) METHOD AND DEVICE FOR DATA PROTECTION

(75) Inventors: Marc Viot, Marseilles (FR); Philippe Baumard, Marseilles (FR)

(73) Assignee: Keyvelop, Boulogne Billancourt (FR)

( * ) Notice: Subject to any disclaimer, the term of this patent is extended or adjusted under 35 U.S.C. 154(b) by 1058 days.

(21) Appl. No.: 10/492,945

(22) PCT Filed: Oct. 17, 2002

(86) PCT No.: PCT/FR02/03551

§ 371 (c)(1),
(2), (4) Date: Nov. 16, 2004

(87) PCT Pub. No.: WO03/034654

PCT Pub. Date: Apr. 24, 2003

(65) Prior Publication Data

US 2005/0081033 A1    Apr. 14, 2005

(30) Foreign Application Priority Data

Oct. 19, 2001 (FR) .................................. 01 13539
Nov. 12, 2001 (FR) .................................. 01 14574
Feb. 15, 2002 (FR) .................................. 02 01896

(51) Int. Cl.
*H04L 9/00* (2006.01)
*G06F 21/00* (2006.01)

(52) U.S. Cl. ...................... 713/170; 713/178; 713/193; 709/206

(58) Field of Classification Search ................. 713/158, 713/170, 176, 177, 178, 189, 193; 709/206
See application file for complete search history.

(56) References Cited

U.S. PATENT DOCUMENTS 5,373,561 A * 12/1994 Haber et al. ................. 713/157
5,615,268 A * 3/1997 Bisbee et al. ................ 713/176
5,978,475 A    11/1999 Schneier et al.

FOREIGN PATENT DOCUMENTS

WO    WO 01/41360 A2 *    6/2001

* cited by examiner

*Primary Examiner*—Gilberto Barron, Jr.
*Assistant Examiner*—Hadi Armouche
(74) *Attorney, Agent, or Firm*—Young & Thompson

(57) ABSTRACT

For controlling the broadcasting of a digital document, the method brings at least three actors into play. First actor is an originator user computer system wherein a file is generated for containing the digital document, digital conditioning attributes corresponding to at least one predetermined event that is liable to affect the data in future use and information that secures data integrity are associated with the data. Second actor is a future user computer system which causes an occurrence of the predetermined event. Third actor is a remote computer system arranged for detecting the event occurrence by storing digital conditioning attributes and information that secures data integrity without knowledge of the digital document.

15 Claims, 4 Drawing Sheets

METHOD AND DEVICE FOR DATA PROTECTION

Figure 1:
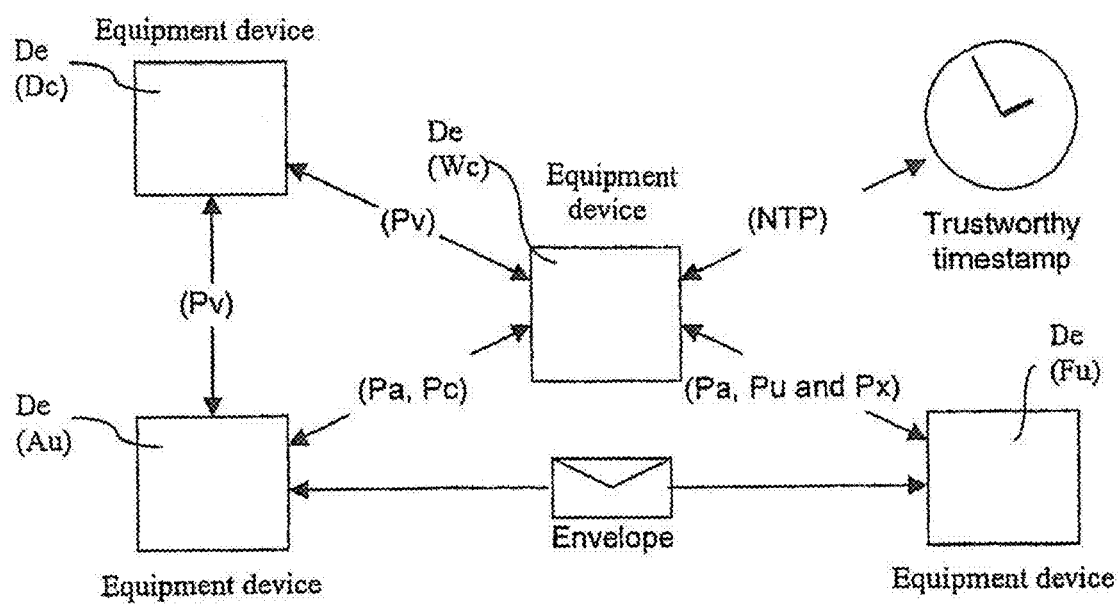

The current invention concerns a method and a device for data protection. It applies in particular to secured digital data processing. More precisely, the present invention is designed to ensure control over the circulation of an electronic piece by its author user.

The traditional digital signature techniques using public keys are meant to guarantee the identity of the author of a piece of work and sometimes add time stamp functions.

The future user of a signed piece of work is guaranteed from the integrity, the author's identification and from the creation date of the work by successively using the author's public key, the date/hour stamping device public key and by checking the list of revoked certificates from a certification authority.

These traditional techniques have several drawbacks, amongst which: i) They don't protect the authors from the risk of theft of their private key; ii) they don't take into account all the notarization aspects, and especially those concerning the destination of digital works, i.e. acknowledgement of receipt features; and iii) they offer no possibility to the authors to control the broadcasting of their work.

To remedy these drawbacks, the traditional solution is usually to create secure channels or trust zones where subscribers of the service can exchange information which may be backed-up in a specific table. This traditional solution is implemented through costly specific development and seldom offsets all of the drawbacks of the digital signature; furthermore it has some serious shortcomings i) what happens to the information once it is out of the secure area and is directed towards an unlisted user or towards a non compatible secure zone?; ii) How are malicious intrusions of secured channels handled?; and iii) They oblige the organization wishing to implement a digital signature solution to entrust the management of its sensitive data to a certification authority.

The present invention aims at overcoming these drawbacks. To that effect, under a first aspect, the present invention relates to a data protection process, characterized in that it includes:

a step of allocating, in the IT system of an author, attributes of "digital conditioning" to the data, attributes corresponding to at least one predetermined event liable to affect the data during its future use, a step of attributing, in the IT system of the author, a piece of information that guarantees the integrity of said data, step of creating an <<envelope>> file, in the IT system of the author, envelope which contains data, digital conditioning attributes pertaining to the data, and the information that guarantees the data integrity, a step of storing, in a remote IT system, of the digital conditioning attributes of the data and of the information that guarantees the data integrity, for each predetermined event related to the data, a step of storing, in the remote IT system, in relation with the attributes of said data, of an identifier and of the date of the event, and at each connection between the author's IT system and the remote system, a step of storing predetermined events corresponding to the attributes of the data in the IT system of the author, so that the IT system of the author keeps track of the identifier of each event concerning the data, the identifier of the user at the origin of the event and the event date.

Thanks to these features, and to the data attributes, the user is informed of all events affecting the data prior to his last connection to the remote system.

According to particular features, during the attribution of digital conditioning attributes, among the attributes of the data, there will be an identifier of the author of the data.

Thanks to these features, each future user accessing the data will know the identity of its author.

According to particular features, during the attribution of digital conditioning attributes, among the attributes of the data there will be an identifier of each new user, signatory or recipient of the data. Thanks to these features, each future user accessing the data will know the identity of each future signatory or recipient.

According to particular features, any event affecting the data by a future user will be restricted to a connection between the IT system of the future user and the remote IT system.

Thanks to these features, the remote IT system and hence the author of the data are informed of all the events affecting the data.

According to particular features, during the storage step in the remote IT system of the event identifier, the remote IT system also stores the identifier of the user at the origin of the event.

Thank to these features, the author is informed of the identity of any future user originating an event on the data.

According to particular features, the device briefly described here above includes a step that determines the usage conditions of the data by the IT system of the author, and at each access query to the data, the usage conditions of the data are checked.

Thanks to these features, the user himself/herself defines the conditions determining future data usage by users.

According to particular features, the usage conditions include identification conditions of the future user. According to particular features, the identification conditions of the user include at least a digital certificate of the IT system of the future user. According to particular features, the identification conditions of the user include at least a digital signature of the IT system of the future user.

Thanks to each of these features, the future user is authenticated and the author can be assured of the identity of all future users of his data.

According to particular features, the usage conditions include the right (or not) to edit the data. Thanks to these features, the author decides whether the data can be modified or not.

According to particular features, the usage conditions include the access rights duration to the data. Thanks to these features, the author can limit the usage period of his data. Note that this period can be a length of time such as two weeks (e.g. for documents to be signed for a company's general meeting), or a deadline (e.g. for a limited sale offer).

According to particular features, the information that guarantees integrity is a hash value. Thanks to these features, the implementation of the information that guarantees data integrity can be simplified and standardized.

According to particular features, each user has an account with a predetermined number of accesses to data called "stamps" and each data access or retrieval will deduct one "stamp" from the user's account. Thanks to these features, the services provided by implementing the present invention can be paid on demand or by subscriptions.

According to particular features the process, as briefly described above, includes during at least one part of the events affecting the data (e.g. the digital signature) a step of transmitting to the author an acknowledgement receipt identifying the future user that has triggered the event.

According to particular features, during the event recording step, the IP address and/or the identifier of the future user's internet service provider (ISP) are recorded.

According to particular features, to carry out at least one of the steps of assigning attributes to the data, in the IT system of the author, of attributing information that guarantees the integrity of the data, and of storing in the remote IT system the data attributes, the sender user carries out a step of selecting, which is equivalent to a mouse click displaying a menu which includes an identification of the process object of the present invention. With specific characteristics, when the user opens a data file, by said selection, he/she triggers the process object of the present invention on said data file. According to particular features, the selection step is carried out by a right-click of the mouse.

Thanks to these features, the use of the process object of the present invention by the author is user friendly and intuitive.

According to particular features, when the data is modified by a future user during a predetermined event, the remote IT system records the modifications of the data. Thanks to these features, the author is informed of the modifications of his data.

According to particular features, the digital conditioning attributes determine which future users will be authorized to sign the data.

According to particular features, for at least one predetermined event, the digital conditioning attributes allocated during the data attributes allocation step, represent an identification of at least one future user. The digital conditioning attributes are called "notarization criteria". Thanks to these features, the author can choose the future users, and among those, the future users with permission to sign data.

According to particular features, for at least one predetermined event, the digital conditioning attributes allocated during the data attributes allocation step, represent a usage conditioning of the data. The digital conditioning attributes are called "control attributes". Thanks to these features, the author can choose which uses of the data are authorized: For instance, read, download, edit.

One notices that notarization criteria and control attributes can be combined so that any future user may be granted specific usage rights. For example, a lawyer could have data editing rights, a signatory may have downloading rights, and a non signatory user simple read rights.

According to particular features, the process includes a transmission step, to each author and to each signatory user, of an identification of at least one predetermined event, of the occurrence date of each predetermined event and of the identification of the future user triggering the event.

Thanks to these features, the author and signatory users are informed of events corresponding to predetermined events linked with the "notarization criteria" affecting the data and prior to their last connections to the remote IT system.

According to particular features, the process includes in the IT systems of the author and of the signatory users, a step of bundling those events, corresponding to predetermined events called "notarization criteria" with the bundle called "envelope" initially created.

Thanks to these features, the bundle called "envelope" helps identifying the events affecting the data, even if duplicated outside the current IT system of the user.

According to particular features, each remote IT system is controlled by another remote IT system called "post office". Thanks to these features, the post office keeps the envelopes sent by the remote IT systems.

According to particular features, the process, as briefly described above, includes a step of bundling the events with the envelope in each IT system of each author and of each signatory user.

With the current techniques, when the author of a document wishes to obtain the signatures of several people and, once he has obtained all the signatures, when he wants to obtain their acknowledgement receipts, he must carry out the following operations:

the author must identify himself/herself as author,
the author sends the document to the first signatory, who signs it and then sends it to the second signatory and so on until all signatories have signed,
the author can only send the document signed by all signatories once they have all signed the document.

The first drawback in this situation is that unless you can reach all signatories at once, only one person has all the preceding signatures.

The second drawback is that acknowledgement receipt are sent to one person only who has to warn the other signatories.

A second aspect of the present invention aims at overcoming these drawbacks. To that effect, the present invention relates to a data processing process, characterized by:

for at least one predetermined event affecting the data, a step of allocating attributes called "digital conditioning notarization" to that data, step in which the digital conditioning attributes represent the identification of at least one future user, a step of creating, in the IT system of the author, an <<envelope>> file which contains data, digital conditioning attributes pertaining to said data, and information that guarantees the integrity of said data, a step of transmitting to each author and to each signatory user, an identifier of the event corresponding to a predetermined event using a digital conditioning notarization attribute, the date of the event and the identification of the future user originating the event, and in the IT systems of each author and of each signatory user, a step of bundling the events with the envelope.

Thanks to these features, the step of bundling allows a synchronized and therefore fast update of the envelopes of each author and of each signatory user.

Under a third aspect, the present invention aims at a data protection process characterized by:

a step of recording, in a remote IT system, attributes of said data from the IT system of an author, for each predetermined event related to the data, a step of storing, in the remote IT system, in relation with the attributes of the data, an identifier and the date of the event, and at each connection between the author's IT system and the remote system, a step of updating and storing attributes of said data, in the IT system of the author, so that the IT system of the author keeps track of the identifier of all the events concerning the data, the identifier of the user at the origin of the event and the date of the event.

Under a fourth aspect, the present invention relates to a data protection device, characterized by:

means for allocating, in the IT system of an author, attributes of "digital conditioning" to the data, attributes corresponding to at least one predetermined event liable to affect the data during its future use, means for attributing, in the IT system of the author, a piece of information that guarantees the integrity of said data, means for creating an <<envelope>> file, in the IT system of the author, envelope file which contains said data, digital conditioning attributes pertaining to said data, and the information that guarantees the integrity of said data, means for recording, in a remote IT system:
  i) digital conditioning attributes of the data and of the information that guarantees the integrity of said data,
  ii) for each predetermined event related to said data, in relation with the attributes of said data, an identifier of the event and the date of the event, and
  iii) at each connection between the author's IT system and the remote IT system, predetermined events corresponding to the attributes of the data in the IT system of the author, so that the IT system of the author keeps track of the identifier of all the events concerning the data, the identifier of the user at the origin of the event and the date of the event.

The advantages and characteristics of the second to fourth aspects of the present invention being identical to those of the first aspect, they will not be repeated here.

Figure 2A:
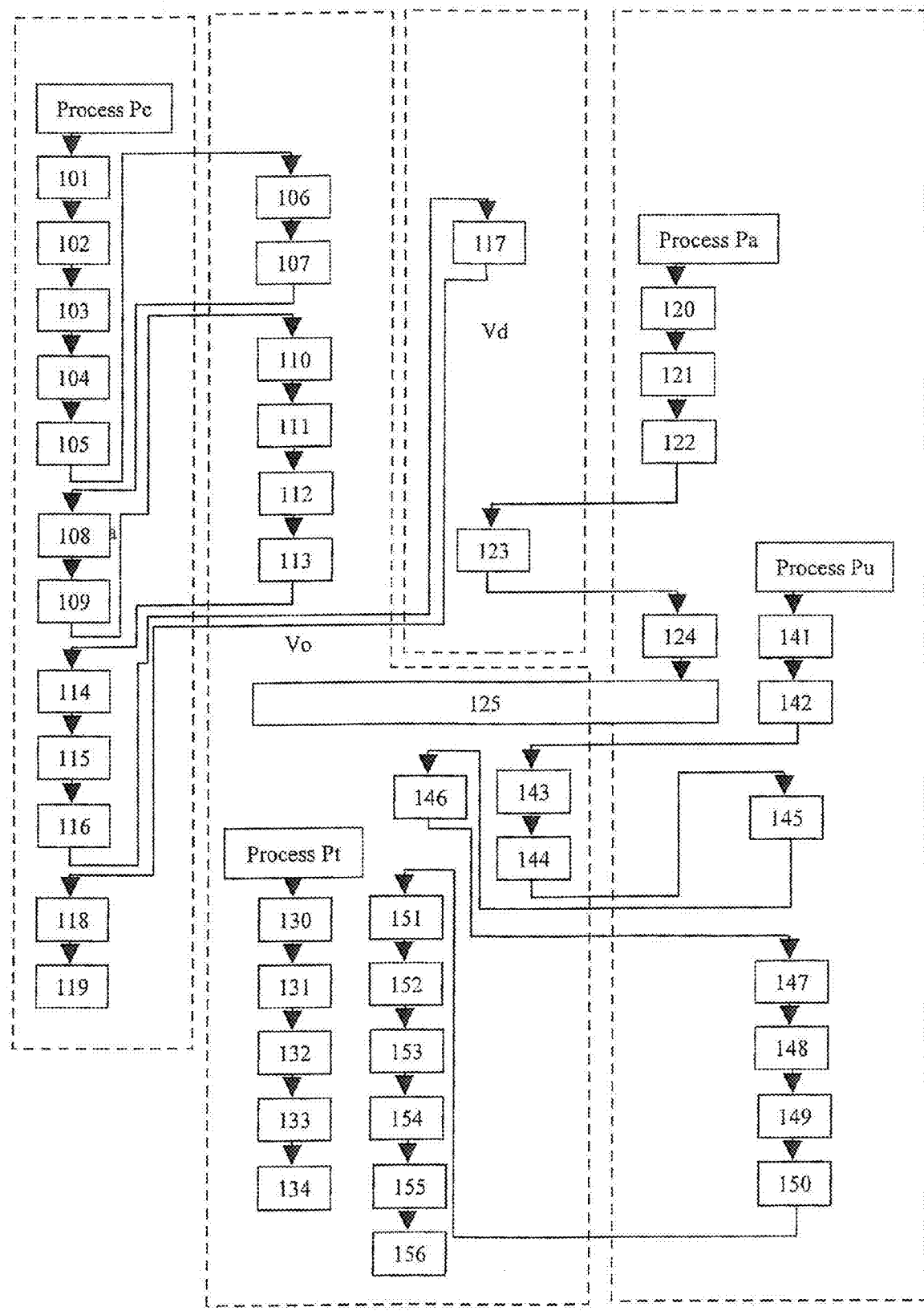
Figure 2B:
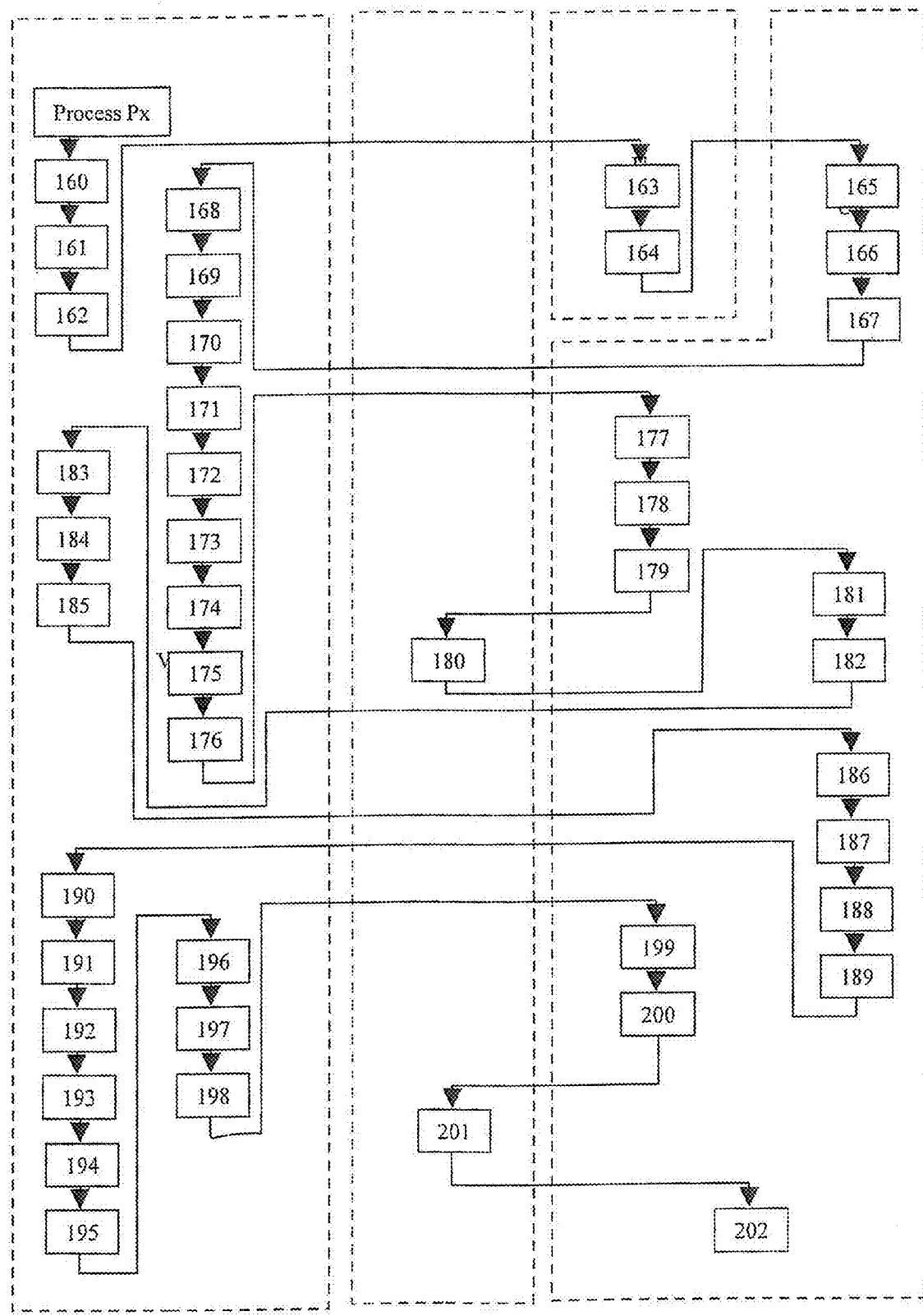
Figure 3:
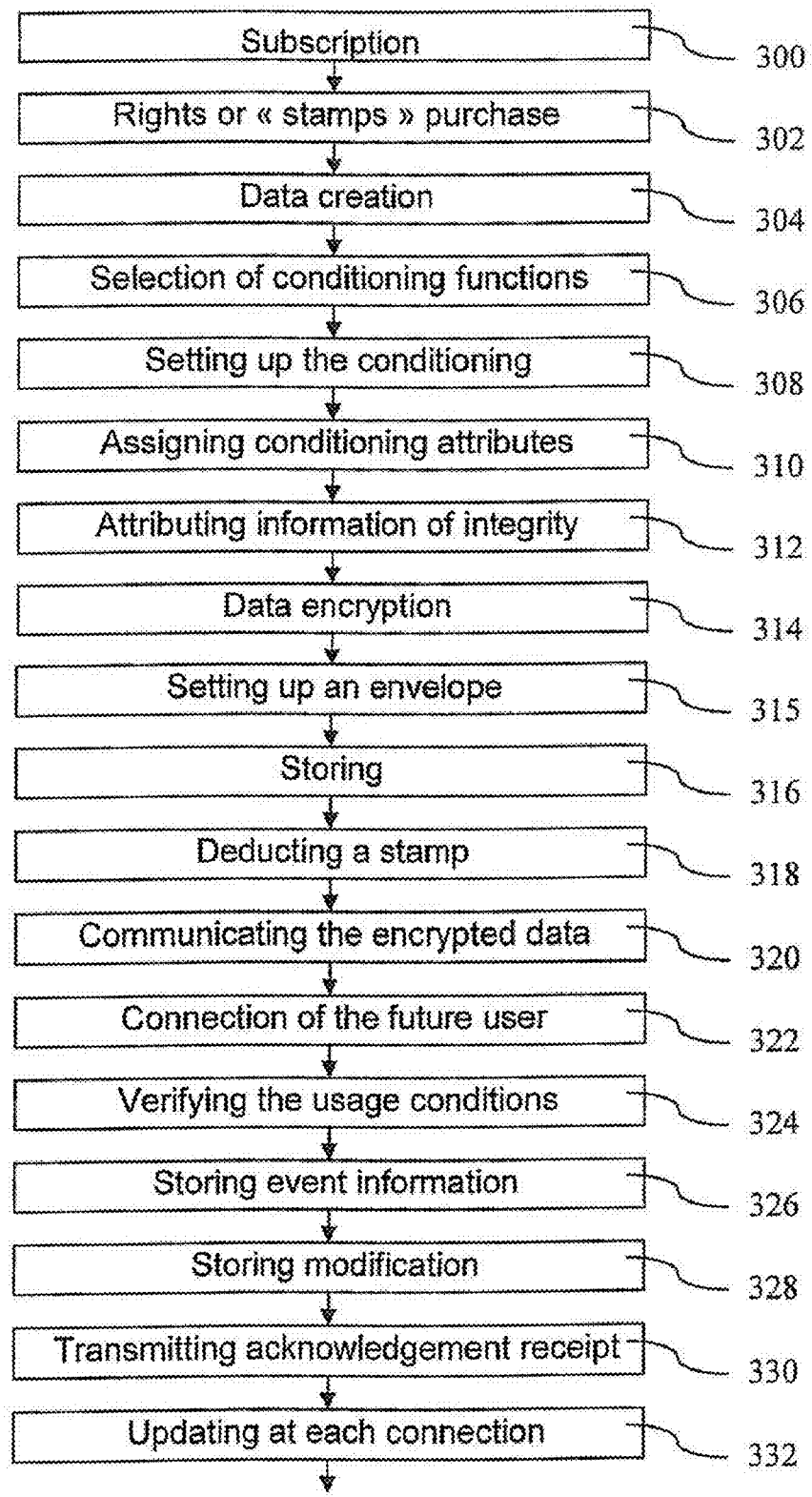

Other advantages, objectives and characteristics of the present invention will appear in the description here below, with the figures in the appendixes in which:

FIG. 1 represents schematically a particular embodiment of the present invention, FIGS. 2a and 2b represents schematically a logical diagram implemented in the first embodiment of the process object of the present invention, and FIG. 3 represents schematically a logical diagram implemented in a second embodiment of the process object of the present invention.

Before describing the figures, here are definitions of the terms used in the description.

A data <<envelope>> is a document, a file or a conditioned work formed by the contents of data, documents, file or work referred to as "digital conditioning".

An <<Au author user>> is an identified user who has been granted envelopes creation rights.

A <<Wc works controller>> or "post office" is a subscriber's monitoring equipment and an envelope circulation equipment.

A <<Dc device controller>> or <<postal agency>> is a management and control equipment for Wc "post offices".

A <<certificate>> is a grouping allowing to check the validity of level of the identity of its owner. In the description, it can take the form of:
  either an e-mail address and the identification is then made during the process of the device Di object of the present invention;
  or through a PKI compliant file and/or ITU X509, the identification is then carried out through a classical public Key embedded in the X509 certificate and the validity of the certificate is checked through the trusted third part specified in the X509 certificate.

A hash value or imprint is the contraction of an initial element such as the initial element cannot be obtained from the hash value and in which the smallest variation of the initial element modifies the hash value.

A <<conditioning>> is the allocation of attributes to data, a file, a document or a piece of work in order to protect them with the present invention, and in some particular embodiments, to guarantee the notarization parameters and control their future circulation and/or modification.

<<Digital conditioning attributes>> is information representatives of predetermined events liable to affect said data during its future use.

<<Circulation control>> are the elements ensuring data traceability, and deciding on their usage conditions.

A <<work>> is any document or set of digitizable documents. This notion includes any type of data, files or documents.

<<Notarization>> is the recording of key elements of the transaction between two parties by an authorized third party. This technique improves the security of an EDI system since it ensures various recording and storing tasks of assent and received transactions (integrity, origin, date and destination of the data) through an authorized third party the trust. The third party must acquire the necessary information through protected communications and store it.

FIG. 1 shows four entities implementing the first embodiment of the present invention:
  the Au author user also called <<sender subscriber",
  in the recipient user also called "future user" Fu,
  a Wc works controller and
  Dc device controller.

The first embodiment illustrated by FIG. 1 also implements a De equipment dedicated to the implementation of the process object of the present invention as well as other processes, Pv, Pa, Pc, Pu, and Px described herein. The produced conditioned document is symbolized in FIG. 1 by an envelope. The date stamp acquired through a trustworthy timestamp is symbolized by an analog dial in by the "NTP" letters referring to the protocol used for timestamp acquisition.

In the first specific embodiment of the present invention illustrated in FIG. 1, the Wc works controller is in charge of user management (adding, modifying, canceling) and of remote control of emitted works and the Dc device controller is in charge of the management of the "post offices" Wc (adding, modifying, canceling), and of the remote control of their proper running.

The Wc works controller submits at each connection the author of the Au work of the Di device to a Pa authentication process. The Wc works controller also carries out in a Pc conditioning process of the creative work, receives and stores, for further comparison in a Pu usage process, all of the works digital conditioning attributes on the De equipment device he uses in the Di device.

As illustrated in FIGS. 2a and 2b, the Pc conditioning process of the digital work O consists of:
  step 101, for the Au author user, to create in empty conditioned document, called envelope, on the equipment device De he uses on the device Di and to name it;
  step 102, for the Au author user, to bundle the Cp core part of the envelope, consisting of the contents of the Ec work to be inserted, optionally of the author certificate, of a free notepad zone and of Nc "notarization" criteria of the envelope, criteria that will allow the adjoining of a secondary envelope Se during the process constituted annex Px of the envelope:
    the future signatory users, under the form of a list Sc of signatory certificates,
    the future recipient users, under the form of a list R1 of recipient certificates,
  step 103, for the Au author user, to define the list of the operations to carry out on opening the envelope Oo: Control of usage conditions (period, frequency, . . . ), routines to be executed (identification, payment, . . . ). Generally speaking, the Di device will only allow access to the contents of the envelope once all the verifications have been made during the Pu usage process.
  step 104, for the Au author user to go through the Pa authentication process,
  step 105, for the Au author user, to send to the Wc works controller an envelope creation request to which the Au author user adds the digital conditioning attributes of the envelope:
    the Nc notarization criteria of the envelope, and
    the list of operations to be performed when opening Oo.

Step 106, for the Wc works controller, to attribute a new instance Ie of the envelope in a table of envelopes Te and to recorder in the instance Ie line the references of the Au author user; to create a Ct conditioning table dedicated to the new envelope where the different digital conditioning attributes of the envelope Nc and Oo transmitted by the Au author user will be stored; to store in the Te table of envelopes, in the corresponding line of the envelope instance Ie the address of the Ct conditioning table newly created.

step 107, for the Wc works controller, to transmit to the Au author user:
 The Ie instance number of the envelope, and
 The Ha hash algorithm type to be used.

step 108, for the Au author user, to generate the Hw hash value of the work with the Ha hash algorithm received to the Cp core part of the envelope.

step 109, for the Au author user, to transmit the Hw hash value to the Wc works controller.

step 110, for the Wc works controller, to receive from a trustworthy timestamp the current date and time using it NTP (Network Time Protocol); to generate a Th timestamp hash value through the application of a Ha hash algorithm to a bundle of the instance number of the envelope Ie, of the Hw work hash value, of the current date and time.

Step 111, for the Wc works controller, to store in the Te envelopes table in the corresponding line that of the Ie envelope instance:
 a) the Hw work hash value,
 b) the date and time of creation of the envelope, as well as
 c) the type of Ha hash algorithm used to generate the Th timestamped hash value; to produce a Sh signed timestamped hash value, by the encryption of the Th timestamped hash value with the current private key of the Wc works controller.

step 112, for the Wc works controller to generate a pair of keys, dedicated to the new envelope instance, one private key Kv and the other one public Kq, according to a key generation algorithm Ak and to store in the table of envelopes Te, to the line corresponding to the Ie envelope instance, its current works generator certificate and the Kq public key which will enable access to the contents of the work, while the Kv private key is not kept after the Pc conditioning process.

step 113, for the Wc works controller, to transmit to the Au author user a bundle consisting of:
 The Ac/Ak encryption method and the Kv key,
 The date and time of the envelope creation,
 The Sh timestamped signed hash value,
 Its X509 Wc controller certificate.

step 114, for the Au author user, to verify the Sh timestamped signed hash value with the public key embedded in the Wc controller certificate.

step 115, for the Au author user, to encrypt with the Ac/Ak encryption method and the Kv key, the Cp core part of the envelope; to form the bundle of the contents of the envelope composed of:
 a version number of the envelope format,
 an X509 certificate of the Wc works controller,
 the instance number In of the envelope,
 the date and time of the envelope creation,
 the Sh timestamped signed hash value,
 the encrypted core part of the envelope,
 the list of operations to be performed when opening Oo.

step 116, for the Au author user and the Wc works controller, to calculate and store, each one separately the updating of the Cq sequence control based upon the application to a chain consisting, on the one hand, of the hash value of the log of the transactions carried out by the user and, on the other hand, of the last transactions carried out by the Au author user, with a Ha hash algorithm; then to transmit said Cq sequence control to the Dc device controller.

step 117, for the Dc device controller, to validate then transaction has been carried through with both parties Au and Wc, by comparing the Cq sequence controls respectively updated by the two parties Au and Wc, and also by checking the consistency of the date and time sent by Wc.

step 118, for the Au author user, to seal the envelope hereafter named "sealed envelope", by saving it under the form of the file on the De equipment device in the Au author user uses on the Di device.

step 119, for the Au author user, to transmit the closed envelope to the first signatory S1 of the list Sc or, if there is no signatory, to all the future users of the R1 recipients list.

After the Pc conditioning procedure, steps 101 to 119, the author of the work, the Au author user may have included his author certificate in the Cp core part of the envelope. If he wishes to be a signatory of the work, he must include himself/herself in the Sc signatories list described in the definition of the secondary part Se of the envelope. Thus one can differentiate between the author and the lawyer who draws up a writ: The lawyer is the author of the writ but not a signatory.

The particular embodiment of the process object of the present invention illustrated in FIGS. 1, 2a and 2b also includes an Pa authentication process of an Iu identified user, author user Au or Fu future user, with the Pv control processes and Pc conditioning processes. The authentication process here consists in:

step 120, during the first connection, for the Iu identified user to connect the authentication support Sa, sent during the Pt "contracting" process, on his De equipment device.

step 121, for the Iu identified user, to produce an identification hash value Ci based on the application of an identification chain defined by the identified user, of the Ha hash algorithm (for the further steps of the process, the Iu identified user must remember this identification chain which will be required for each connection).

step 122, then for the Iu identified user, to form a Cc connection chain composed of one fixed contents part and one variable contents part in depending on the transactions carried out on the Di device equipment by the Iu user:
 a) the Cf fixed part contents is composed of the Ca agreement code found on the support provided by the Pt contract process and of the identification hash value Ci; and
 b) the variable part contents Cq, also called sequence control, is based upon the application to a chain, made of their hash of the log of the transactions carried out by the user on the one hand, and of the last transactions carried out by the Iu user, of a Ha hash algorithm.

step 123, for the Dc device controller, to receive the Cc connection chain from the Iu identified user, to extract the Ca agreement code, the identification hash value Ci, the Cq variable part contents, to compare the elements Ca and Cq with the corresponding user references stored in the table of the Tu table of identified users, and if consistent, to complete the references of said Tu table by adding the Ci identification hash value.

step 124, for the following connections, for the Iu identified user, to connect the Sa authentication support.

step 125, for the Iu identified user and the Wc controller of the Di device, to produce, each of them, a Cc connection chain. Then for the Wc controller, to compare the connection chain it has produced with the one produced by the Iu identified user.

The particular embodiment of the process object of the present invention illustrated in FIG. 1 also includes an Pc contract process, process following an attempt from a user to identify himself/herself and/or to subscribe on the Di device and which is characterized for the Wc works controller, by the production of an authentication support Sa, support which is delivered to the Iu identified user, following the Pa authentication process and the Pc conditioning process, which consists for the Wc works controller of:

step 130, to produce an Ca agreement code, based on the application to an identity chain, provided by the Iu user of a Ha hash algorithm. The identity chain is composed of several elements regarding the identity of the Iu identified user (for example, for a private natural person: name, first name, date and place of birth).

step 131, to produce an email address specific to the Iu identified user, such as user@device.com step 132, to record the identity chain and the email address in a Tu identified Users table, stored on the on the De equipment device used in the Di device.

step 133, to register the Ca agreement code and the email address on a physical authentication support Sa.

step 134, to deliver to the Iu user the authentication support Sa.

The particular embodiment of the process object of the present invention as illustrated in FIG. 1 also includes a Pu usage processing (process characterized by the implementation of digital conditioning attributes contained in the envelope upon access to said envelope by a Fu future user and particularly:

a step of checking that the usage conditions of the data are respected for or each predetermined event, during the conditioning process, a step of storing said events, in the remote IT system, and then of transmitting them towards the IT system of the author user).

the envelope following the control process Pv and the conditioning process Pc, which consist in:

step 141, for the Fu future user, to execute a first unbundling of a closed envelope from which are retrieved:

a version number of the envelope format, an X509 certificate of the Wc works controller, the In instance number of the envelope, the date and time of the envelope creation, the Th timestamped signed hash value, the encrypted core part of the envelope, the list of operations Oo to be carried out upon opening, the secondary part Se, added during the Px process.

step 142, for the Fu future user, to connect to the Wc works controller determined during the first unbundling and to issue the In instance number of the envelope.

step 143, for the Wc works controller to point in the table of envelopes Ye to the instance corresponding to the received In instance number.

step 144, for the Wc works controller to verify in the Ct conditioning table of the envelope pointed to, if all the visas of the future users of the Sc recipients list and of the future users of the R1 recipients list have been stored. If this is the case, the Wc works controller authorizes the Fu future user to go ahead with the process. If not, the Wc works controller launches the "constitute annex" Px process.

step 145, for the Fu further user, to execute the actions of the list of operations Oo to be executed upon opening; to transmit to the Wc works controller a bundle formed of the reports of the executed actions.

step 146, for the Wc works controller, to validate this report by transmitting to the Fu future user a bundle formed of the Kp public key, the Ac deciphering and Ha hashing algorithm types, all being memorized in the instance pointed at in the table of envelopes Te.

step 147, for the Fu future user, to decipher the Cp core part of the envelope by using the Kp public key and the received Ac encryption algorithm.

step 148, for the Fu further user, of debundling the Cp core part of the envelope and to open its contents:

the contents of the Ec work, the optional author certificate, the optional notes and the Nc notarization criteria (list of the signatory certificates Sc and of the recipient certificates R1).

step 149, for the Fu further user, to debundle the secondary part Se where will be found, in their order of appearance on the Sc and R1 lists for each signatory and each recipient:

the certificate of the signatory of the hash value Sh, the date and time stamp of the visa, and the Sh timestamped signed hash value.

step 150, for the Fu future user, to proceed, if he wishes so, to various checks, such as verifying:

a. the contents of the envelope, its creation date and the identity of its author by deciphering the Sh timestamped signed hash value using the elements included in the X509 certificate embedded in the envelope and by comparing it against the hash value resulting from the different elements of the envelope (the Ie instance number of the envelope, the Hw work hash value, the current date and time, a Ha hash algorithm—the Hw work hash value corresponding to the hashing of the Cp core part of the envelope).

b. verifying in a similar manner the identity of the signatories or recipients and the date of their visas by using timestamped signed hash values and the certificates included in the secondary envelope Se.

c. requesting confirmation to the Wc works controller by transmitting the different timestamped hash values resulting from the previous checks (i) and (ii).

step 151, for the Wc works controller, upon request of a Fu future user, to compare the timestamped hash values transmitted by the Fu future user with the initial timestamped hash values, one of them being stored in the table of envelopes Te at the instance pointed at during the Pu usage process, and for the other ones, in the corresponding conditioning table Ct.

step 152, for the Wc works controller, to receive from a trustworthy timestamp the current date and time using NTP (Network Time Protocol);

step 153, for the Wc works controller, to produce a signed timestamped hash value with the application of a hash algorithm to a bundle formed a. of the confirmation text and b. of the date and time of confirmation step 154, for the Wc works controller, to produce a signed timestamped hash value, by the encryption of the Th timestamped hash value with the current private key of the Wc works controller step 155, for the Wc works controller, to produce a signed confirmation by forming a bundle composed of:

a. of the confirmation text b. of the date and time of confirmation c. the signed timestamped hash value d. of its X509 Wc controller certificate;

step 156, for the Wc works controller, to transmit the signed confirmation to the Future User Fu.

The particular embodiment of the process object of the present invention as illustrated in FIGS. 1, 2a and 2b also includes a "constitute annex" Px process (This process allows:

to inform the author user and the signatory users of events corresponding to predetermined events called "notarization criteria" and to bundle these events with the initial envelope to store its information, even if the envelope is duplicated outside the usual It system of the user) of the envelope following the Pu usage process of the envelope which consists in:

In a first phase, step 160, for the Wc works controller, to identify, in the Ct conditioning table, the envelope pointed to during the Pu usage process, the first signatory of the Sc list with a missing visa or, if all the visas of the signatories are present, to go to the second phase.

step 161, for the Wc works controller, to submit the Fu future user to an Pa authentication process. In case the Fu future user is not an Iu identified user for the system, to request from him/her a signed X509 identity certificate, to control its signature and to check its validity (non revoked) through the trusted third part specified in said certificate.

step 162, for the Wc works controller, to validate this identification by transmitting to the Fu future user, a bundle formed of the Kp public key, the Ac deciphering and Ha hashing algorithm types to be used, the whole being stored in the table of envelopes Te at the instance pointed at during the Pu usage process.

step 163, for the Fu further user, to decipher the Cp core part of the envelope by using the Kp public key and the received type of Ac encryption algorithm.

step 164, for the Fu further user, to debundle the Cp core part of the envelope and to open its contents:
the contents of the Ec work,
the optional author certificate,
the optional notes,
the Nc notarization criteria (list of the signatory certificates Sc and list of the recipients R1).

step 165, for the Fu further user, to generate the Hw hash value of the work with the Ha hash algorithm received to the core part of the envelope Cp.

step 166, for the Fu identified further user, to transmit the Hw hash value to the Wc works controller;

step 167, for the Fu further user, non identified by the system, to sign the Hw hash value by applying to it an encryption algorithm using the private key corresponding to the X509 certificate already transmitted; then to transmit the Hw hash value together with the signed hash value to the to the Wc works controller.

step 168, for the Wc works controller, to control the received hash value (and in the case of a signed hash value, previously deciphered) by comparing it with the hash value previously stored in the table of envelopes Te during the Pc conditioning process of the envelope.

step 169, for the Wc works controller, to receive from a trustworthy timestamp the current date and time using it NTP (Network Time Protocol).

step 170, for the Wc works controller, to generate a Th timestamp hash value through the application of a bundle of the In instance number of the envelope, of the hash value of the core part Cp of the envelope (together with the signed hash value for the non identified users), of the current date and time, of an Ha hash algorithm.

step 171, for the Wc works controller, to store in the conditioning table Ct of the envelope pointed to during the Pu usage process, the signatory of the Sc list with a missing visa:
a. the Hw hash value (and if applicable for the non identified users of the signed hash value)
b. the date and time of visa as well as
c. the type of Ha hash algorithm used to generate the Th timestamped hash value.

step 172, for the Wc works controller, to generate, for the new signatory, a pair of keys, one private key Kv, and the other one public Kq key, with an Ak key generation algorithm, while the Kv private key is not kept after the "constitute annex" Px process.

step 173, for the Wc works controller, to produce a Sh signed timestamped hash value, by the encryption of the Th timestamped hash value with the current Kv private key generated for the new signatory.

step 174, for the Wc works controller, to store in the in the pointed Ct conditioning table dedicated to the Ie envelope instance:
a. the Kq public key of the transaction (with its X509 Wc controller certificate in case of a non identified user), the elements being used to verify the timestamped signed hash value,
b. the date and time of visa of the signatory, and
c. the signed timestamped hash value.

step 175, for the Wc works controller, to transmit to the Fu future user a bundle formed of:
a. the Kq public key of the transaction (with its X509 Wc controller certificate in case of a non identified user),
—these elements being used to verify the timestamped signed hash value,
b. the date and time of visa of the signatory,
c. the signed timestamped hash value.

step 176, for the Wc works controller, to transmit this bundle to all the other signatories who have stamped the envelope and who are listed in the Sc list.

step 177, for the Fu further user and the previous signatories, to add the received bundle to the contents of the secondary part Se of the envelope.

step 178, for the identified Fu further user and the Wc works controller, to calculate and store, each, the update of the Cq sequence control, based upon the application to a chain, consisting of, on the one hand, a hash value of the log of the transactions carried out by the user and, on the other hand, the last transactions carried out by the Fu user, of an Ha hash algorithm.

step 179, for the Fu further user, to transmit said Cq sequence control to the Dc device controller.

step 180, for the Dc device controller, to validate the transaction has been carried through with both parties Au and Wc, on the one hand, by comparing the Cq sequence controls respectively updated by the two parties Au and Wc and, on the other hand, also by checking the consistency of the date and time sent by Wc.

step 181, for the Fu further user, whether identified or not, to transmit the sealed envelope and its secondary part, to the next signatory of the Sc list, or if there is no signatory, to all recipients of the R1 list.

step 182, for the Fu further user, identified by the system, to end the process by retrieving its Sa authentication support.

In a second phase, step 183, for the Wc works controller, to store in the Ct conditioning table pointed to during the Pu usage process, the recipients of the R1 list with a missing visa.

step 184, for the Wc works controller, to submit the Fu future user to an Pa authentication process. In case the Fu future user is not an Iu identified user for the system, to request from him/her a signed X509 identity certificate, to control its signature and to check its validity (non revoked) through the trusted third party specified in said certificate. In case the Fu future user does not have an X509 certificate, to request from him/her a Cr confirmation of receipt in an email-confirmation including:
  a. the In instance number of the envelope,
  b. the Sh timestamped signed hash value,
  c. if possible the serial number of his De equipment device,
  d. his/her email address.

step 185, for the Wc works controller, to validate this identification by transmitting to the Fu future user, a bundle formed of the Kp public key, the Ac deciphering and Ha hashing algorithm types to be used, the whole being stored in the table of envelopes Te at the instance pointed at during the Pu usage process.

step 186, for the Fu further user, to decipher the Cp core part of the envelope by using the Kp public key and the received type of Ac encryption algorithm.

step 187, for the Fu further user, to debundle the Cp core part of the envelope and to open its contents:
  a. the contents of the Ec work,
  b. the optional author certificate,
  c. the optional notes,
  d. the Nc notarization criteria (list of the signatory certificates Sc and list of the recipients R1);

step 188, for the Fu further user, to generate the Hw hash value of the work with the Ha hash algorithm received to the core part of the envelope Cp.

step 189, or the Fu further user, non identified by the system, but having an X509 certificate, to sign the Hw hash value by applying to it an encryption algorithm using the private key corresponding to the X509 certificate already transmitted; then to transmit the Hw hash value together with the signed hash value to the Wc works controller.

step 190, for the Wc works controller, to control the received hash value (and in the case of a signed hash value, previously deciphered) by comparing it with the hash value previously stored in the table of envelopes Te during the Pc conditioning process of the envelope.

step 191, for the Wc works controller, to receive from a trustworthy timestamp the current date and time using it NTP (Network Time Protocol).

step 192, for the Wc works controller, to generate a Th timestamp hash value through the application of a bundle of the instance number Ie of the envelope, of the hash value of the core part of the envelope Cp (together with either the signed hash value for the non identified users, or a Cr confirmation of receipt), of the current date and time, of an Ha hash algorithm.

step 193, for the Wc works controller, to store in the Ct conditioning table of the envelope pointed to during the Pu usage process, the recipient of the list R1 with a missing visa.
  a. the Hw hash value (and with either the signed hash value for the non identified users, or a Cr confirmation of receipt),
  b. the date and time of visa as well as
  c. the type of Ha hash algorithm used to generate the Th timestamped hash value.

step 194, for the Wc works controller, to generate, for the new recipient, a pair of keys, one private key Kv, and the other one public Kq key, with an Ak key generation algorithm, the Kv private key not being kept after the "constitute annex" Px process.

step 195, for the Wc works controller, to produce a Sh signed timestamped hash value, by the encryption of the Th timestamped hash value with the current Kv private key generated for the new recipient.

step 196, for the Wc works controller, to store in the pointed conditioning table Ct dedicated to the Ie envelope instance:
  a. the Kq public key of the transaction (with either its X509 Wc controller certificate in case of a non identified user, or a Cr confirmation of receipt), these elements being used to verify the timestamped signed hash value,
  b. the date and time of visa of the recipient, and
  c. the signed timestamped hash value.

step 197, for the Wc works controller, to transmit to the Fu future user a bundle formed of:
  a. the Kq public key of the transaction (with either its X509 Wc controller certificate in case of a non identified user, or a Cr confirmation of receipt), the elements being used to verify the timestamped signed hash value,
  b. the date and time of visa of the recipient, and
  c. the signed timestamped hash value.

step 198, for the Wc works controller, to transmit this bundle to all the other signatories who have stamped the envelope and who are listed in the Sc list.

step 199, for the Fu further user and the previous signatories, to add the received bundle to the contents of the secondary part Se of the envelope.

step 200, for the identified Fu further user and the Wc works controller, to calculate and store, each one separately the updating of the Cq sequence control, based upon the application to a chain, consisting of, on the one hand, a hash value of the log of the transactions carried out by the user and, on the other hand, the last transactions carried out by the Fu user, of an Ha hash algorithm; and to transmit said Cq sequence control to the Dc device controller.

step 201, for the Dc device controller, to validate the transaction has been carried through with both parties Fu and Wc, on the one hand, by comparing the Cq sequence controls respectively updated by the two parties Fu and Wc and, on the other hand, also by checking the consistency of the date and time sent by Wc.

step 202, for the Fu further user, identified by the system, to end the process by retrieving its Sa authentication support.

The particular embodiment of the process object of the present invention as illustrated in FIGS. 1, 2a and 2b are implemented by a device equipment De, for instance a microcomputer for example, PC compatible—or any programmable device, able to run the various processes of the device Di object of the invention and equipped with:
  an operating system able to run the various processes of the device Di
  a device for accessing a WAN managed by the operating system (ex: modem, LAN/WAN card)
  and the following peripherals managed by the operating system:
  a. either a reader of non modifiable authentication support Sa (for example: cd-rom)
  b. or a reader of authentication support Sa, allowing the remote modification of a memory area (ex: dongle, smart card, . . . ).

Said equipment devices De specifically dedicated to each of the four "entities" of the Di device:
  a. the author and creator of the work, <<the Au author user",
  b. the user of the work, <<Fu future user",
  c. the Wc conditioned works controller
  d. the Dc device controller.

In a first application, the equipment device De is a microcomputer—for example a PC compatible one-, with a cd-rom drive and a modem; the authentication support Sa is a cd-rom; The operating system is Linux with a 2.2 kernel.

Within this application, the Ha hash and encryption algorithms using a Ac/Ak public key, which are referred to in the present description, are SHA (acronym for <<Secure Hash Algorithm>> for the Ha algorithm and RSA (acronym for <<Rivest, Shamir and Adelman") for the Ac and Ak algorithm.

According to a variant of the first two applications, the Ha hash algorithm is MD5 (acronym of "Message Direct 5").

According to a variant of the first two applications, the encryption algorithm Ac/Ak using a public key is the DH (acronym of <<Diffie-Hellman").

According to a variant of the first two applications, the encryption algorithm Ac/Ak using a public key is DSA (acronym of "Digital Signature Algorithm>>).

The description of the FIGS. 1, 2a and 2b refer to a <<PC compatible>> micro-computer with a Linux operating system, but also applies to any programmable equipment running an operating system able to run the various processes of the Di device, and particularly a micro or mini computer, with a standard configuration-processor, mother board, controller cards of the standard peripherals and standard peripherals (keyboard, display, storage peripheral)—with an operating system able to run the various processes of the present device.

The description of the FIGS. 1, 2a and 2b refer to Ha SHA and MD5 hash algorithms, but also applies to any algorithm resulting in the contraction of an initial element such as the initial element cannot be obtained from the hash value and in which the smallest variation of the initial element modifies the hash value.

The description of the FIGS. 1, 2a and 2b refer to Ac public key encryption algorithms, DH and DSA, but also applies to any algorithm resulting in the encryption of a message by a private key and its deciphering by a public key, and such as the deciphering of the private key from the public key is made as complex as possible.

One notices, in FIG. 3, a second embodiment of a typical application of the invention including:

a 300 step of the user subscribing to a data conditioning service, a step 302 of user rights purchase, called <<stamps>>, by said user, from the data conditioning service, the number of stamps owned by said user being kept by a remote It system accessible from the IT system of the author user via internet, a step 304 of data creation, for instance using a word processing software, a spreadsheet, or a CAD software, while the document containing the data to be protected is open, a step 306 of selecting the conditioning functions offered by the implementation of the present invention, in which the user right-clicks his pointing devise, a mouse for instance, visualizes the contextual menu mentioning a reference to the data conditioning object of the present invention, and selects the conditioning function, a step 308 of setting up the conditioning, in which the user may select the usage conditions of the data:

a. at least one future user is authorized to access the data, in read only mode, or in edit mode, b. at least one future user is authorized to access the data, in read and write mode, c. or a time limit in the access rights, for instance by selecting a predetermined time span, e.g. two weeks, or by the selection of an expiration date for the data, and d. authentication conditions for each recipient future user, for instance, password, digital certificate, digital signature, a step 310 of assignation, in the IT system of an author user, of attributes referred to as <<digital conditioning>> of said data, attributes corresponding to at least one predetermined event that is liable to affect said data in the course of their future use, including, identifiers of future users authorized to be exposed to said data (<<recipients>>), identifiers of future users signatories of said data, the access conditions (personal code, digital signature, for instance) and use of said data (right to copy, download or modify the data, for instance) and if applicable, an identification of the author of the data, a step 312 of attribution, in the IT system of an author user, of information that guarantees the integrity of said data, a hash value for instance, as shown on FIGS. 1, 2a and 2b, a step 314 of data encryption, a step 315 of setting up a file called <<envelope>>, in the IT system of an author user, envelope carrying data, of digital conditioning attributes affected to said data and some information that secures the integrity of said data, a 316 step of storage, in a remote IT system, of the digital conditioning attributes of said data (element enabling the deciphering of said encrypted data, for instance) of the information that secures the integrity of said data, and if applicable, of said encrypted data, a step 318 of deducting a stamp from the number of stamps on the author user's account, a step 320 of communicating said data or information on the availability of said data, between the author user and a recipient future user, a step 322 of connecting the recipient future user and the remote IT system, to access said encrypted data (preferably, each event regarding said data can only be set, by a future user, during a connection between the IT system of said future user and the remote IT system), a step 324 of verifying the usage conditions of the data are respected by the recipient further user (right or not to edit data, identification of the future user through the implementation of a digital certificate or of a digital signature identifying the IT system of the future user or the future user himself/herself, for instance)

for each event regarding said data, and particularly, each access to said data and each modification of said data, a step 326 of storage, in the remote IT system and in relation with the attributes of said data, of an identifier of said event, of the date of said event, and if applicable, an identifier of the user at the origin of the event, an internet address (<<IP>>) and/or an identification of the Internet Service Provider ("ISP") of the future user, when said data is modified by the recipient future user, the remote IT system goes through the step 328 storing the modifications made to said data, during at least one part (for instance the digital signature and/or the modification of the data) of the events affecting said data, a step 330 of transmission, to the author user, of an acknowledgement receipt identifying the recipient future user who triggered said event (as a variation, during the transmission step 330, you transmit, to each author user and to each signatory user, an identifier of at least one predetermined event, of the occurrence date of each predetermined event and of the identification of the future user triggering the event), and at each connection between the author's IT system and the remote IT system, an update and storage step 332 of predetermined events corresponding to the attributes of the data in the IT system of the author, so that the IT system of the author keeps track of, for each event regarding said data, the identifier of said event, the identifier of the user at the origin of the event and its date (preferably, the step 332 includes a bundling step of said IT events occurred with said envelope, in each IT system of each author and of each signatory user, either automatically, or as soon as he connects to the remote IT system).

One notices that the data within the envelopes is modifiable only under the following circumstances:

the data within the envelope is impossible to forge; and the events resulting in the modification of the data inside the envelope are stored but they do not cancel nor replace the initial data provided by its author.

According to variants, each access to data will deduct one "stamp" from the user's account.

Each step of FIG. 3 is explained with the description of FIGS. 1, 2a and 2b.

The invention claimed is:

1. A process for protecting data, comprising:
   a step of assigning (310), in an IT system of an author user, attributes referred to as <<digital conditioning>> of said data, attributes corresponding to at least one predetermined event that affects a future use of said data in the course of said data's future use by a future user,
   a step of attributing (312), in the IT system of the author user, information that secures an integrity of said data,
   a step of encrypting (314), by the IT system of the author user, said data using said information that secures the integrity of said data,
   a step of setting up a file called <<envelope>> (315), in the IT system of the author user, envelope carrying data, digital conditioning attributes affected to said data and information that secures the integrity of said data,
   a step of storing (316) from an IT system of the author user in a remote IT system, digital conditioning attributes affected to said data, information that secures the integrity of said data and said encrypted data,
   a step (322) of connecting a recipient future user and the remote IT system, to access encrypted data,
   for each predetermined event related to said data, a step of storing (326), in the remote IT system and in relation with the attributes of said data, of an identifier of said event and of the date of said event, and
   at each connection between the author's IT system and the remote IT system, a step of storing (332) predetermined events corresponding to the attributes of the data, in the IT system of the author, so that the IT system of the author keeps track, for each event regarding said data, of the identifier of said event, the identifier of the user at the origin of the event and the date of said event,
   wherein said envelope is transmitted from the author user to the recipient future user via a path separate from the remote IT system, the remote IT system controlling a transfer between the users,
   wherein each event regarding said data can only be set, by the future user, during a connection between the IT system of said future user and the remote IT system.

2. The process according to claim 1, wherein during the attribution of digital conditioning attributes, the attributes of said data include an identifier of the author of the data.

3. The process according to claim 1, wherein during the attribution of digital conditioning attributes, the attributes of said data include an identifier for each future user, signatory or recipient, of said data.

4. The process according to claim 1, wherein during the step of storing, in the remote IT system, the event identifier (326), the remote IT system also stores an identifier of the author user at the origin of said event.

5. The process according to claim 1, further comprising a step of determining the usage conditions of said data, by the IT system of the author user, and, upon each access query to said data, a step of checking that the usage conditions of the data are met.

6. The process according to claim 5, wherein the usage conditions include identification conditions of the future user.

7. The process according to claim 6, wherein identification conditions of the future user include, at least, the implementation of a digital certificate identifying the IT system of the future user.

8. The process according to claim 6, wherein identification conditions of the future user include, at least, the implementation of a digital signature identifying the IT system of the future user.

9. The process according to claim 5, wherein usage conditions of the future user include or not a right, to edit said data.

10. The process according to claim 1, wherein during at least one part, for instance the digital signature, of the events affecting said data, a transmission step, to the author user, of an acknowledgement receipt identifying the recipient future user who triggered said event (330).

11. The process according to claim 1, wherein when, during a predetermined event, said data is modified by the recipient future user, the remote IT system goes through the step of storing the modifications made to said data (328).

12. The process according to claim 1, wherein the digital conditioning attributes determine which future users will be authorized to sign the data.

13. The process according to claim 1, wherein at least one predetermined event, the digital conditioning attributes allocated during the step of attributing data attributes, represent a usage condition of said data.

14. The process according to claim 1, wherein the process includes a step of transmitting, to each author user and to each signatory user, an identifier of at least one predetermined event, the date of each predetermined event and the identification of the future user triggering the event (330).

15. The process according to claim 14, further comprising a step of bundling said events with said envelope, in each IT system of each author and of each signatory user.

* * * * *